United States Patent
Saunders et al.

(10) Patent No.: US 6,504,362 B2
(45) Date of Patent: Jan. 7, 2003

(54) PROCESS OF MEASURING SLIDE-READING OF ABUTTED-JUNCTION READ HEADS

(75) Inventors: Douglas Saunders, Lakeville, MN (US); Juan Fernandez-de-Castro, Lakeville, MN (US); Erli Chen, Roseville, MN (US); Lujun Chen, West Hills, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/902,988

(22) Filed: Jul. 11, 2001

(65) Prior Publication Data

US 2001/0053037 A1 Dec. 20, 2001

Related U.S. Application Data

(60) Provisional application No. 60/217,958, filed on Jul. 13, 2000.

(51) Int. Cl.$^7$ .................. G01R 33/12; G11B 21/02; G11B 5/02; G11B 5/39
(52) U.S. Cl. .................. 324/210; 360/55; 360/75; 360/324.1
(58) Field of Search .................. 324/210, 212, 324/252; 360/327.1, 327.31, 327.32, 75, 55, 77.04, 319, 324.1, 313

(56) References Cited

U.S. PATENT DOCUMENTS

| | | | |
|---|---|---|---|
| 5,018,037 A | * 5/1991 | Krounbi et al. | 360/327.31 |
| 5,434,826 A | 7/1995 | Ravipati et al. | 367/140 |
| 5,646,805 A | * 7/1997 | Shen et al. | 360/327.1 |
| 5,739,987 A | * 4/1998 | Yuan et al. | 360/327.32 |
| 5,754,376 A | * 5/1998 | Kobayashi et al. | 360/327.31 |
| 6,097,578 A | 8/2000 | Pokhil | 360/319 |
| 6,134,090 A | 10/2000 | Mao et al. | 360/324.1 |
| 6,169,646 B1 | 1/2001 | Macken et al. | 360/319 |
| 6,385,017 B1 | * 5/2002 | Min et al. | 360/324.12 |

FOREIGN PATENT DOCUMENTS

EP 0 263 681 10/1987

OTHER PUBLICATIONS

"Side Crosstalk Response in Perpendicular Magnetic Recording with Narrow Track Width Single–pole Head" by J. Numazawa et al., IEEE Translation Journal on Magnetics in Japan, vol. 5, No. 3, Mar. 1990, pp. 219–224.*

"Off–track Performance of Thin Film Single Pole Head for Perpendicular Double–layered Media" by H. Yamada et al., IEEE Transactions on Magnetics, vol. 34, No. 4, Jul. 1998, pp. 1468–1470.*

(List continued on next page.)

Primary Examiner—David Hudspeth
Assistant Examiner—Dan I. Davidson
(74) Attorney, Agent, or Firm—Westerman, Champlin & Kelly, P.A.

(57) ABSTRACT

Side-reading of an abutted-junction magnetic transducer is measured by constructing at least one microtrack having a transition density. The transducer is moved relative to the microtrack to identify a plurality of positions of the transducer relative to the microtrack where the transducer provides a predetermined response. The side-reading distance of the transducer is identified from the plurality of positions. In one embodiment, a plurality of microtracks are constructed during different iterations, each having a different transition density, and the positions of the transducer are identified during each iteration relative to the respective microtrack. In another embodiment, the selected transition density has a fundamental frequency, and the position of the transducer is identified relative to the microtrack where the transducer provides the predetermined response at each of a plurality of harmonic frequencies of the fundamental frequency.

20 Claims, 11 Drawing Sheets

OTHER PUBLICATIONS

"Side Crosstalk Response in Perpendicular Magnetic Recording with Narrow Track Width Single–pole Head" by J. Numazawa et al., *IEEE Translation Journal on Magnetics in Japan*, vol. 5, No. 3, Mar. 1990.

"Off–track Performance of Thin Film Single Pole Head for Perpendicular Double–layered Media" by H. Yamada et al., *IEEE Transactions on Magnetics*, vol. 34, No. 4, Jul. 1998.

"Cross–track Characteristics of Shielded MR Heads" by Samuel W. Yuan, *IEEE Transactions on Magnetics*, vol. 30, No. 2, Mar. 1994.

"Off–Track Spacing Loss of Shielded MR Heads" by Yuan et al., *IEEE Transactions on Magnetics*, vol. 30, No. 3, May 1994.

* cited by examiner

PROCESS OF MEASURING SLIDE-READING OF ABUTTED-JUNCTION READ HEADS

CROSS-REFERENCE TO RELATED APPLICATION

This application claims benefit of U.S. Provisional Application No. 60/217,958 filed Jul. 13, 2000 entitled "A Method of Measuring Side-Reading Width in Abutted-Junction GMR Recording Heads".

FIELD OF THE INVENTION

This invention relates to a process of measuring the side-reading of abutted-junction read heads for magnetic storage devices, and particularly to measuring the width of abutted-junction magnetoresistive and giant magnetoresistive heads.

BACKGROUND OF THE INVENTION

Magnetoresistive (MR) and giant magnetoresistive (GMR) heads are employed in magnetic storage devices to read data recorded in a recording medium, such as a rotating disc. Data are recorded as transitions in magnetic domain orientations in the recording medium so that as the medium moves past the head, the transitions in magnetic orientation causes transitions in magnetic flux to the head. Transitions in magnetic flux in the head causes changes in the electrical impedance of the MR or GMR element. The changes in the electrical impedance are detected by applying a bias current through the head and detecting changes in the voltage across the head. Consequently, the changing voltage across the head is representative of the data recorded on the magnetic medium.

MR heads employ a magnetoresistive layer whose resistance changes with transitions in external magnetic fields from data on the passing magnetic recording media. GMR heads employ a stack of at least three layers, namely a ferromagnetic active or free layer, a ferromagnetic pin layer and a nonmagnetic spacer layer sandwiched between the two ferromagnetic layers. The direction of magnetization in the pin layer is held constant while the magnetization in the active or free layer is permitted to rotate in response to the external magnetic field. The GMR element is sometimes called a spin valve due to the rotation of magnetization in the free layer. The resistivity of the stack varies as a function of the angle between the magnetization of the free or active layer and the magnetization of the pin layer. Contact layers are attached to the MR element or GMR stack to supply bias current to the element or stack to permit measurement of resistance.

Many MR and GMR heads employ permanent magnets abutting opposite sides of the magnetoresistive element or stack. These heads are referred to as "abutted-junction" MR and GMR heads. Usually, the head is formed by forming the element or stack on a planar lower shield and thereafter forming the permanent magnet and contact layers. The height configurations of the permanent magnet and contact layers often require that an upper shield, opposite the lower shield, be of varying distance from the lower shield. More particularly, the height of the permanent magnet and contact layers together is often greater than the height of the MR layer or GMR stack, so the portion of the upper shield over the permanent magnet and contact layers is at a greater distance from the lower shield than the portion of the upper shield over the MR or GMR. Moreover, due to the tapered junction between the permanent magnet and the MR element or GMR stack, some portions of the element or stack are wider across the track width of the head than other portions of the element or stack.

Many magnetic heads respond to changing magnetic fields outside the bounds (width) of the head. This effect, called a "side-reading" effect, is a source of noise in the recovered data signal, and a source of cross-talk, a phenomenon where the read head reads data from two or more adjacent tracks.

At least two factors contribute to side-reading in abutted-junction heads. First, the flux density of the magnetic field created by the data on the recording media is greatest when the head is centered on the track. The recording tracks are usually wider than the read head width, so that when the head is centered on a track, magnetic flux from portions of the track beyond the width of the transducing read gap (the width of the MR or GMR element, for example) are read. Read heads are designed such that the length of the transducing read gap (in the direction of track length) is a little more than the minimum spacing between successive transitions along the track. By limiting the length of the transducing gap, two or more successive transitions are not read simultaneously as to cancel each other out. However, in abutted-junction read heads, the spacing between the top and bottom shields increases (along the track length) outside the width of the head, resulting in plural transitions between the shields outside the head width and a canceling effect on the read signal. Second, in abutted junction GMR heads, the active or free layer of the stack extends outside the effective width of the read head due to the tapered abutted-junction structure. This extended portion of the active or free layer extends into the contact region where shield-to-shield spacing is greater, thus increasing side-reading.

Areal data density for a magnetic media is the product of the bit density along the length of the recording tracks and the density of those tracks in a direction normal to the track length. As track density increases, track width and spacing decreases and areal density increases. However, smaller track widths and spacing requires read heads with more narrow widths. As track spacing becomes smaller, the effects of side-reading in read heads becomes more critical. The effects of side-reading in read head is a limiting factor on the spacing between adjacent tracks, and hence a limiting factor to increased areal density.

Considerable research is being conducted into the design of read heads to minimize the effective width of the head. One factor in that research is the minimization of side-reading of heads. However, there has been no effective technique for measuring side-reading in a head. The present invention provides a solution to this and other problems, and offers other advantages over the prior art.

SUMMARY OF THE INVENTION

The present invention is directed to measuring the side-reading of an abutted-junction transducer, such as a magnetoresistive or giant magnetoresistive read head. The transducer is moved relative to at least one microtrack having a selected transition density. A plurality of positions of the transducer are identified relative to the at least one microtrack where the transducer provides a predetermined response. The side-reading distance of the transducer is identified from the plurality of positions.

In one embodiment, a plurality of microtracks are constructed during respective iterations, each microtrack having a different transition density. The positions of the transducer are identified during each iteration relative to the respective microtrack where the transducer provides the predetermined response.

In another embodiment, the selected transition density has a fundamental frequency. The positions of the transducer are identified relative to the microtrack where the transducer provides the predetermined response at each of a plurality of harmonic frequencies of the fundamental frequency.

Other features and benefits that characterize the present invention will be apparent upon reading the following detailed description and review of the associated drawings.

DETAILED DESCRIPTION OF ILLUSTRATIVE EMBODIMENTS

Figure 1:
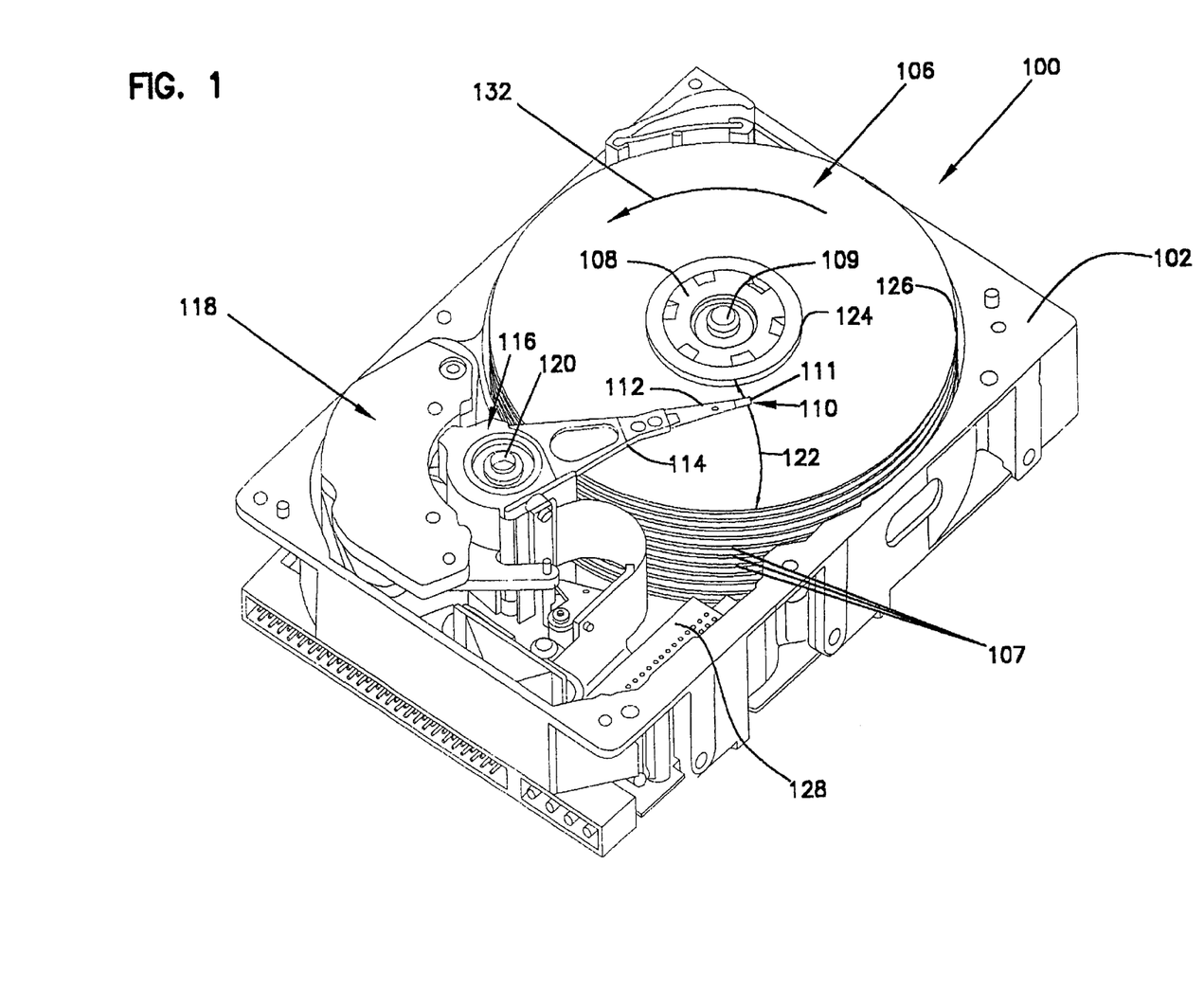
FIG. 1 is a perspective view of a disc drive illustrating the environment in which read heads are used.

FIG. 1 is a perspective view of a disc drive 100 with which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc 107, and a transducing head 111 arranged to write data to, and read data from, concentric tracks on the confronting disc surface. More particularly, head 111 includes a read portion to read data from a confronting disc 107 and a write portion to write data to a confronting disc 107. The head includes an air bearing surface that confronts disc 107 and supports the head above the disc surface when the disc is rotated. The read and write portions of the head include transducing gaps at the air bearing surface that confront the disc.

In the example shown in FIG. 1, head-sliders 110 are supported by suspensions 112 which are in turn attached to track accessing arms 114 of an actuator 116. Actuator 116 is driven by a voice coil motor (VCM) 118 to rotate the actuator, and its attached heads 110, about a pivot shaft 120. Rotation of actuator 116 moves the heads along an arcuate path 122 to position heads 111 over a desired data track between a disc inner diameter 124 and a disc outer diameter 126. Voice coil motor 118 is driven by servo electronics included on circuit board 130 based on signals generated by the heads 111 of head-sliders 110 and a host computer (not shown). Read and write electronics are also included on circuit board 130 to supply signals to the host computer based on data read from disc pack 106 by the read portions of heads 111, and to supply write signals to the write portions of heads 111 to write data to the discs.

Figure 2:
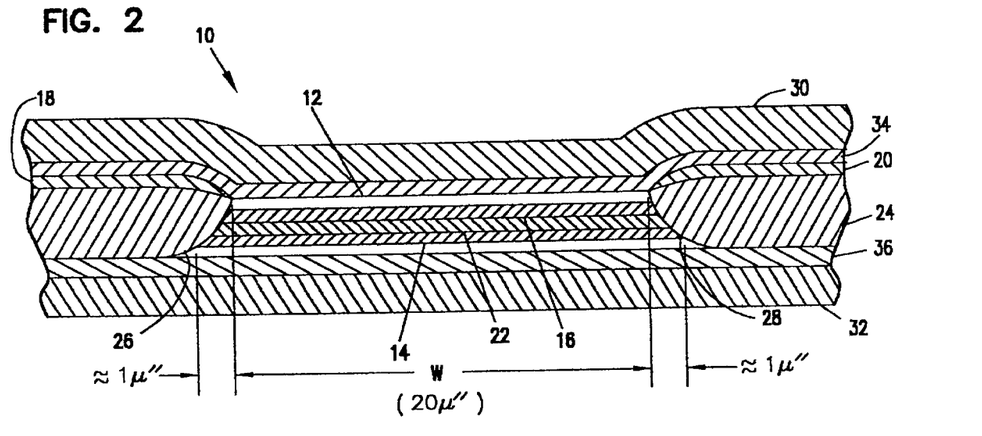
FIG. 2 is a section view, at the air bearing surface, of a typical giant magnetoresistive head whose side-reading is to be measured in accordance with the present invention.

FIG. 2 is a section view taken at the air bearing surface of a giant magnetoresistive read head 10. Head 10 includes a stack 12 forming the giant magnetoresistive (GMR) element, also known as a "spin valve". Stack 12 includes at least three layers, including an active, or free, layer 14 consisting of a ferromagnetic material whose magnetization direction is permitted to rotate in the magnetic field to which the element is exposed. The stack also includes a pin layer 16, also formed of ferromagnetic material, whose magnetic orientation is fixed by the bias current through contacts 18 and 20. A non-magnetic layer 22 separates free layer 14 from pin layer 16. In most embodiments, the GMR element includes additional layers, and may include additional free layers 14.

Head 10 also includes a layer 24 of permanent magnet material forming an abutted-junction 26, 28 on each side of stack 12. Shields 30 and 32 shield the GMR element from extraneous magnetic fields. Spacer layer 34 electrically separates shield 30 from contacts 18 and 20 and from GMR stack 12, and spacer layer 36 electrically separates shield 32 from permanent magnet layer 24 and GMR stack 12.

The head illustrated in FIG. 2 is constructed by thin film techniques of deposition and etching to form the structure illustrated. Stack 12 and permanent magnet layer 24 are formed during the deposition and etching processes to form abutted-junctions 26 and 28 between them at an angle of about 30° to the plane of bottom shield 32. The width W of the read head formed by stack 12 is defined by the effective width of the read gap formed by free layer 14. Typically, however, the tapered angle to the junction with the permanent magnet 24 results in the ends of the free layer 14 extending into a region under the permanent magnet. This region is also the region of the greater separation between shields 30 and 32, resulting in greater shield-to-shield separation and diminished shielding effects. Consequently, the head is responsive to magnetic fields outside the region of the head width.

Generally, the width W of a head is considered to be the bounds where the response of the head to external magnetic fields is 50% of the maximum response at head center. Stated another way, the head width W is that dimension along the width of the head where the response is 50% or greater of the maximum response. One technique for measuring the response of a head uses a narrow test track, or microtrack, containing flux transitions, or changes, of known frequency, or density (usually expressed in kiloflux changes per inch—KFCI). The head is positioned at various locations relative to the test track so that the center of the test track confronts various positions across, and beyond, the width of the head. The head's response is greatest when the microtrack is centered on the head, and rolls off to near zero beyond its width.

The microtrack is typically constructed by recording a single track on a disc, usually one that is not adjacent other tracks. The track is-recorded with a pattern of flux transitions at the predetermined transition density, and is "trimmed" to the desired width relative to the original track. For example, the microtrack may be trimmed from the original track to a width of about 2.0 microinches (50.8 nanometers).

The width and side-reading of head 10 can be measured by moving the head in a direction across the width of the microtrack (radially, in the case of a circular track) so that the microtrack is centered adjacent various positions across and beyond the width of a 20.0 microinch (508 nanometer) wide head. Physically, in the case of an abutted-junction GMR head as illustrated in FIG. 2, the 50% response point is usually quite close to the closest points of permanent magnet layer 24.

Figure 3:
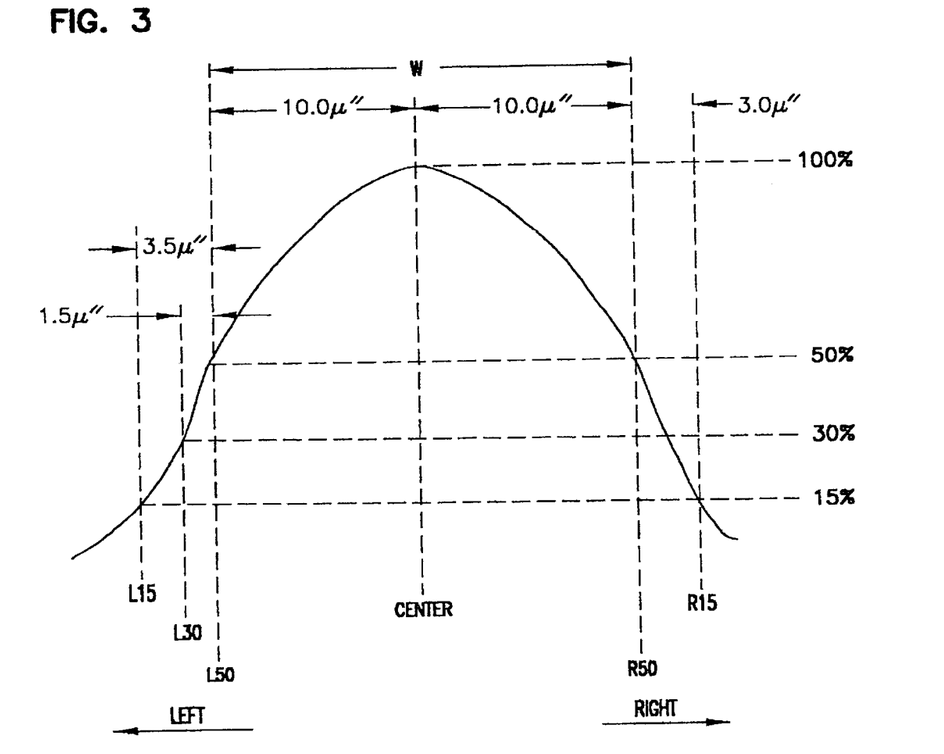
FIG. 3 illustrates the response profile of the head illustrated in FIG. 2 across and beyond its width.

FIG. 3 illustrates the response of the GMR head shown in FIG. 2 in a direction across the width of the read head, and beyond. A magnetic field adjacent to the read head will create a response of greatest amplitude when the microtrack is positioned at the center of the width of the free layer, and the amplitude will diminish (roll off) as the position of the microtrack is moved toward and past the edges of the free layer. Considering the center of the width as a response of 100%, the response drops to about 50% at the edges defined by the width W of the head. The response further drops outside the width of the head, tapering to near zero beyond the bounds of the head. The amplitude drops dramatically between about 50% to 15% amplitude in a short distance from the edge of the head defined by width W. A "perfect" head would be one whose response resembles a square wave, dropping rapidly to near zero at the points defined by the width of the head. Such a head would exhibit near zero side-reading, and would be quite satisfactory in environments where track spacing is minimized. However as shown in FIG. 3, in practice a head exhibits a significant response due to side-reading. Several factors contribute to this increased response due to side-reading in the 50% to 15% range: First, the spacing between shields 30 and 32 increases outside the head width due to increased thickness of the permanent magnet layer 24 and contacts 18 and 20. This increased shield-to-shield spacing decreases shielding of the head, allowing simultaneous reading of several transitions on the adjacent medium. Reading of several transitions results in a canceling effect of the magnetic flux and decreases the response of the read head. Second, the portion of free layer 14 that extends beyond the bounds of the read region defined by width W due to the tapered abutted-junction 26, 28 senses a magnetic field beyond the head width.

It is known that the response of a read head diminishes as the transition density increases. We have discovered that the response of a head diminishes more quickly outside the width of the head than, at the center as the transition density increases. Consequently, response points of less than 50% become closer to the center of the head as the transition density along the track increases. Moreover, we have discovered that this movement-of the response point is a measure of side-reading of the head. Therefore, according to the present invention, the position where the predetermined read head response (which is less than 50% of peak response) is measured at different transition frequencies (densities). The result is a measure of side-reading of the head. In preferred forms of the invention, the head width is measured at a response of less than 30%, and as low as 10% peak response. The result is a direct measurement of the side-reading of the read head.

We conducted experiments to measure the side-reading width of an abutted-junction GMR head as depicted in FIG. 2. The physical characteristics of the head were measured by microscope imaging and by computer simulation. The measurements revealed a minimum spacing or width W between the permanent magnet layers that abut the sides of the GMR stack of 20.0 microinches (508 nanometers), a tapered abutted junction at about 30° to the lower shield, and an active or free layer that extended about 1 microinch (25 nanometers) past the width edge (the free layer having a width of about 22 microinches—558 nanometers). Additionally, the shield-to-shield spacing between the top and bottom shields 30 and 32 at the end of the free layer was about 27% larger than that at the center of the head.

A microtrack having a width of 2.0 microinches (51 nanometers) was formed on an otherwise blank test disc. The read head was scanned across the microtrack from about 20 microinches to the right of head center to about 20 microinches to the left of head center. The amplitude of the head response was measured at the various positions of read head relative to the microtrack and plotted at FIG. 3 as a fraction of the response when the head was centered on the microtrack. The response profile shown in FIG. 3 reveals a 50% amplitude response of the head when the microtrack is positioned 10.0 microinches (254 nanometers) on each side of the head center, identified as L50 and R50, a 30% response was read at 11.5 microinches (292 nanometers) each side of head center at L30 and R30, and a 15% response was read at 13 microinches (330 nanometers) to the right of head center(R15) and at 13.5 microinches (343 nanometers) to the left of head center (L15). Noteworthy, physical measurements taken of the head revealed a width of 20.0 microinches, corresponding to the 50% response points R50 and L50 of the test. Consequently, the L50 and R50 positions in FIG. 3 are quite close to the edges of the read head width.

Figure 4:
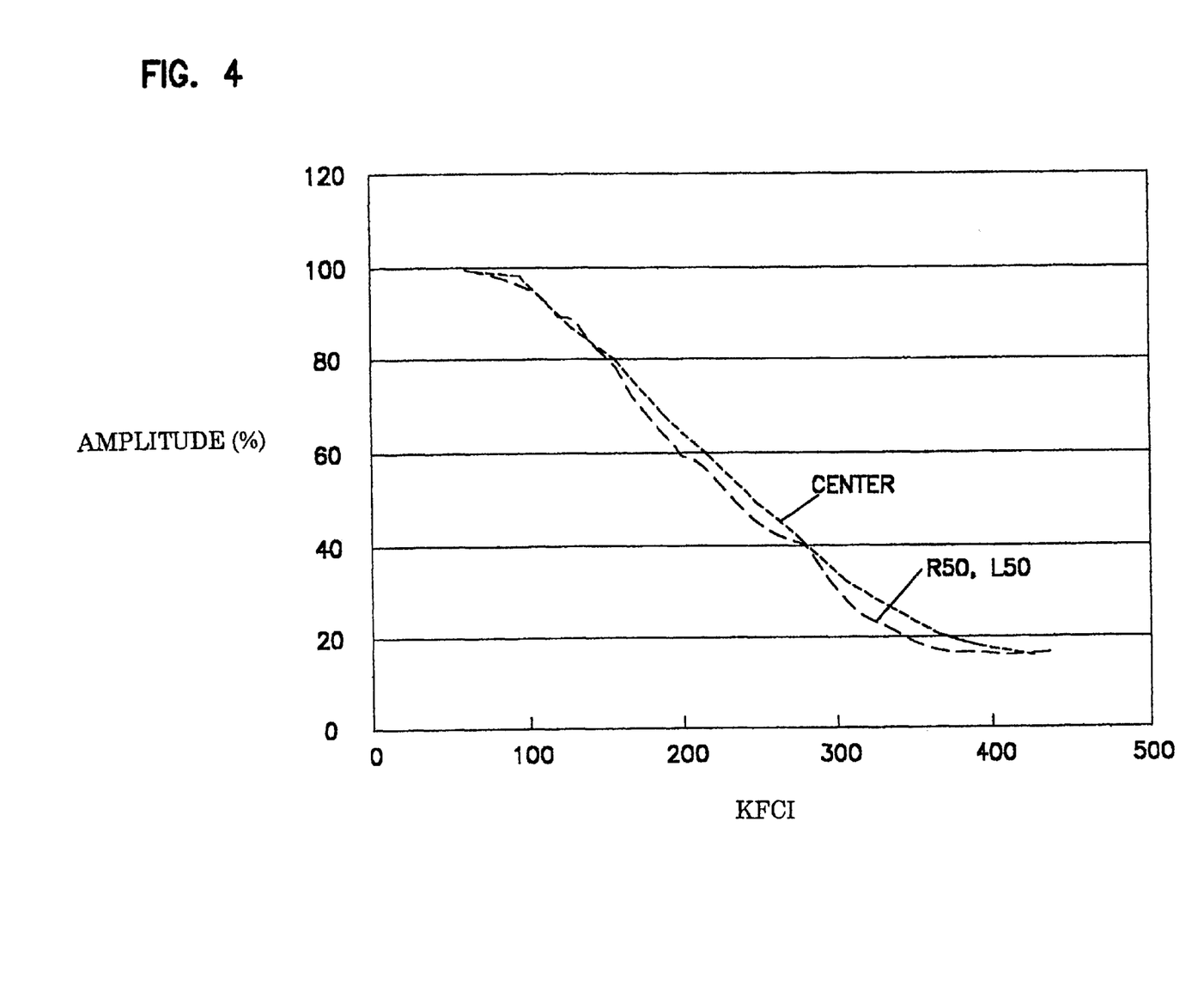
FIGS. 4–8 are graphs illustrating the response of a head under various experimental and theoretical conditions.
Figure 5:
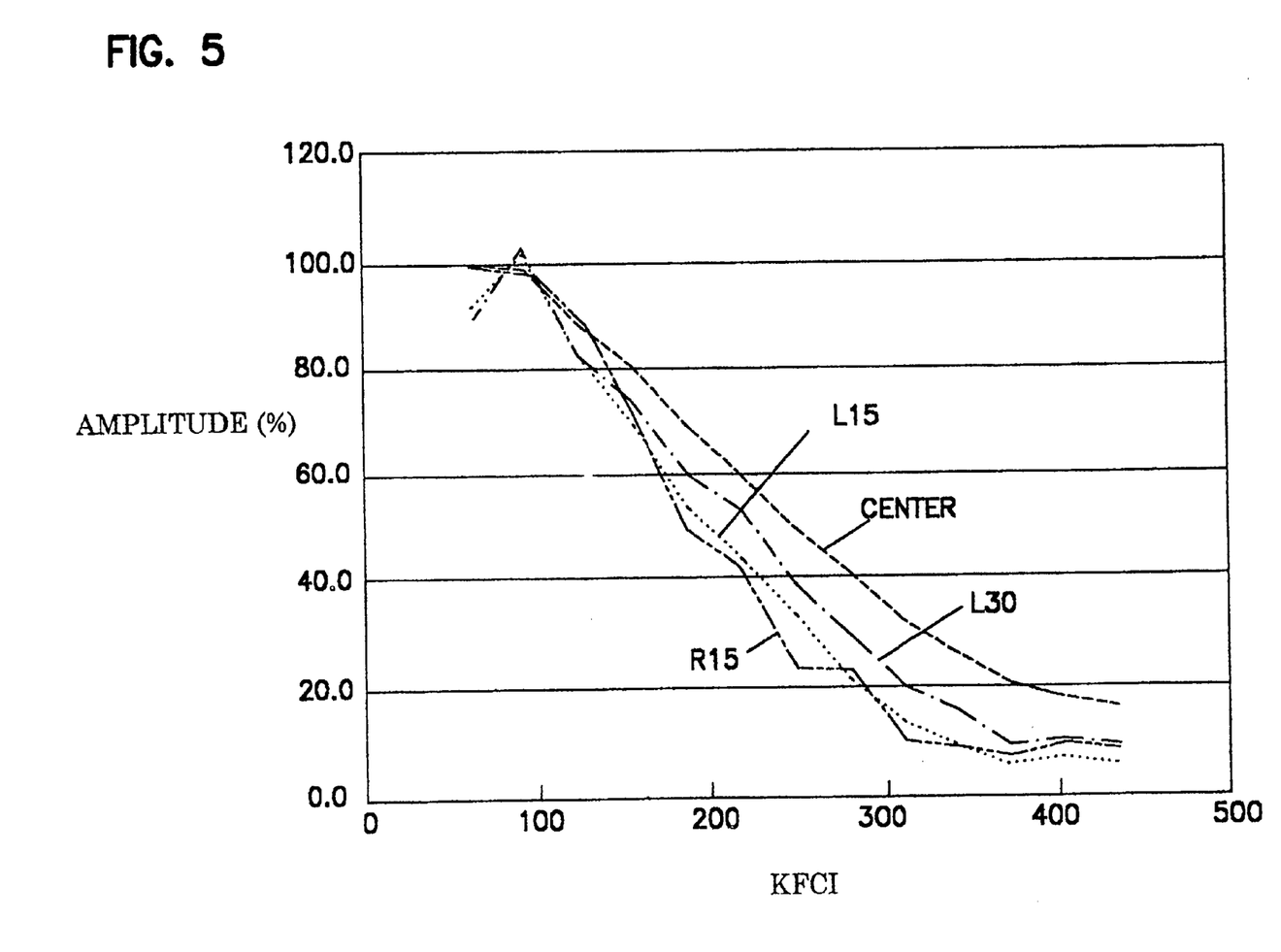

Experiments were Also conducted, to identify the amplitude of the response at various positions across and beyond the width of the head at various transition densities between about 50 kiloflux changes per inch (KFCI) and 450 KFCI. FIG. 4 illustrates the amplitude response of the head (as a percentage of a response when the head is-centered on the microtrack) when the head is positioned at R50 and L50 and (for purposes of comparison) when centered on the microtrack, over the range between 50 and 450 KFCI. FIG. 5 illustrates the response of the head at positions L15, R15, L30 and centered on the microtrack. A comparison of FIGS. 4 and 5 reveals that the response of the head over the 50 to 450 KFCI range is similar when centered on the microtrack and at positions R50 and L50 (FIG. 4), whereas the change in response become more pronounced when the amplitude is below 50%, outside of positions L50 and R50 (FIG. 5).

Figure 6:
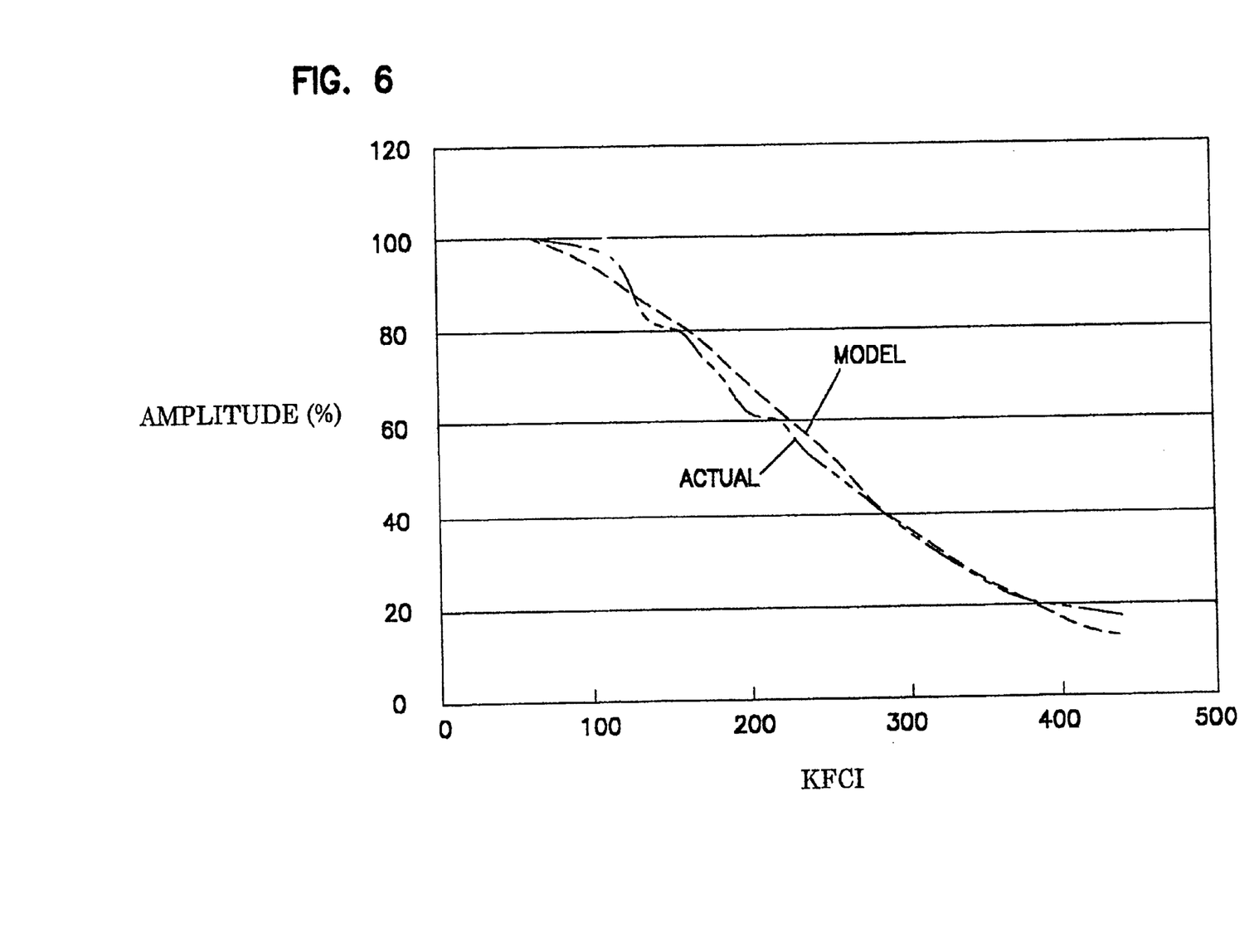
Figure 7:
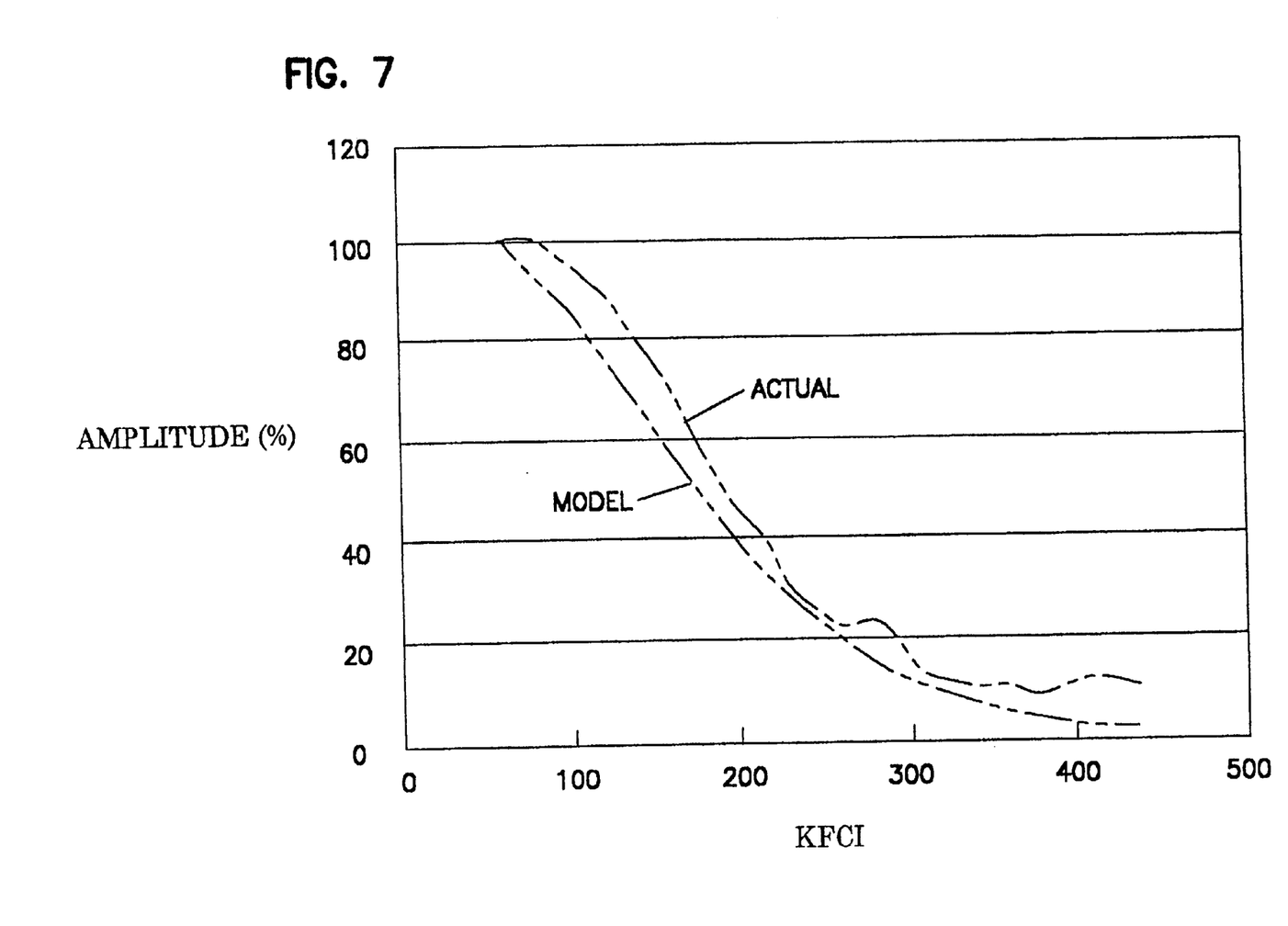

We constructed computer models simulating the theoretical response curves for the head over the range between 50 and 450 KFCI with the head centered on the microtrack and at positions R15 and L15. We then experimentally measured the response of the head centered on the microtrack and at position R15, over the 50 to 450 KFCI range. The results of this experiment are illustrated in FIGS. 6 and 7. FIG. 6 illustrates that the experimental results of the amplitude measurement of the head when centered on the microtrack closely followed the model. However, as shown in FIG. 7, at position R15 the actual response was quite different from the model.

Figure 8:
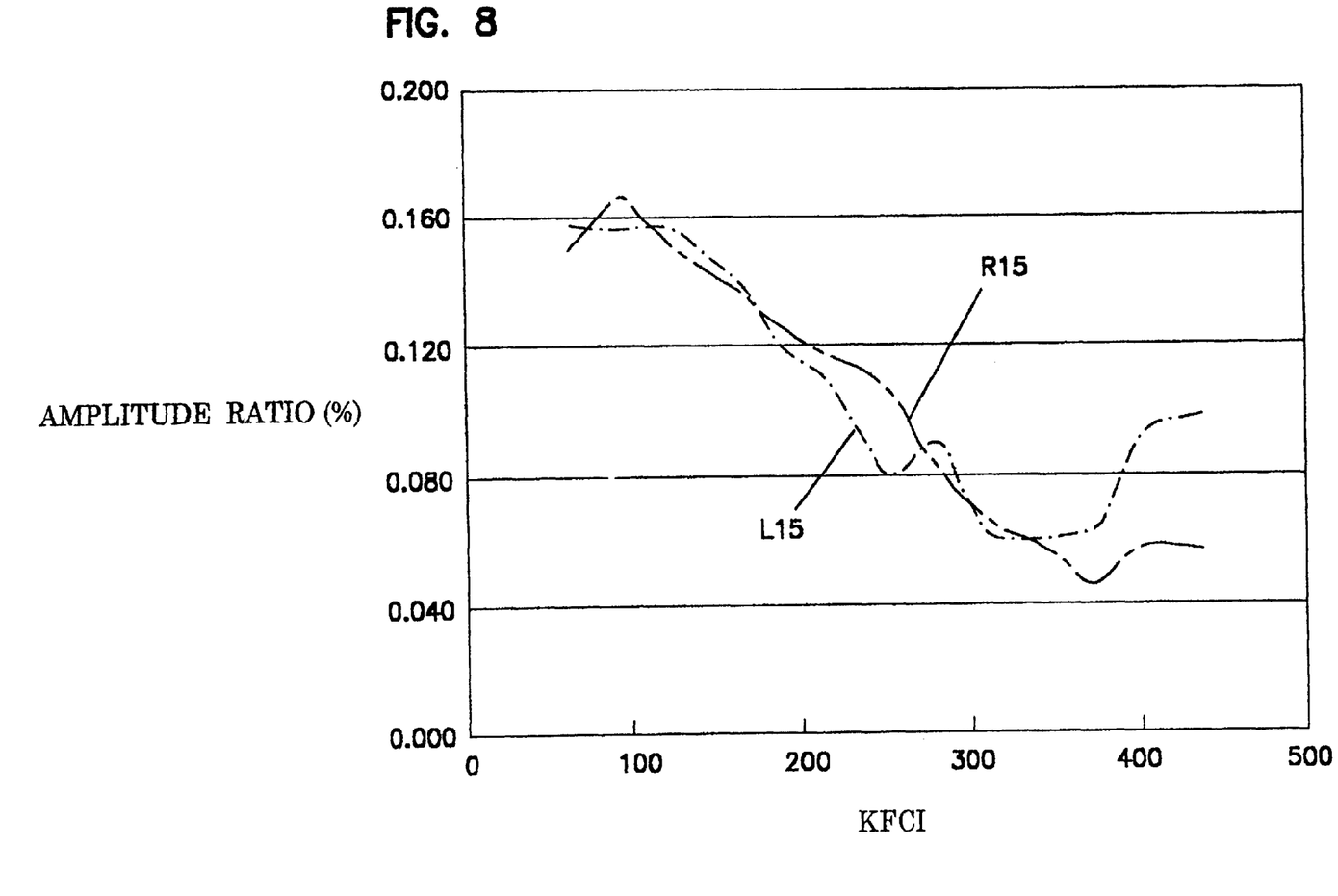

A head having a free layer extending one microinch past its edge can read as far as about three microinches from its edge, presenting an "apparent" width of 26 microinches (where the actual width is 20 microinches). However, as the transition density along the tracks increases, side reading decreases. FIG. 8 illustrates plots showing the ratio of the amplitudes when the head is at positions L15 and R15 to when it is centered on the microtrack (i.e., $Amp_{L15}/Amp_{center}$ and $Amp_{R15}/Amp_{center}$). FIG. 8 demonstrates that the ratio decreases as the recording track density along the track increases. (In this example, data above about 300

KFCI could not be accurately measured, leading to the discrepancies illustrated in FIG. 8 above about 300 KFCI.)

Figure 9:
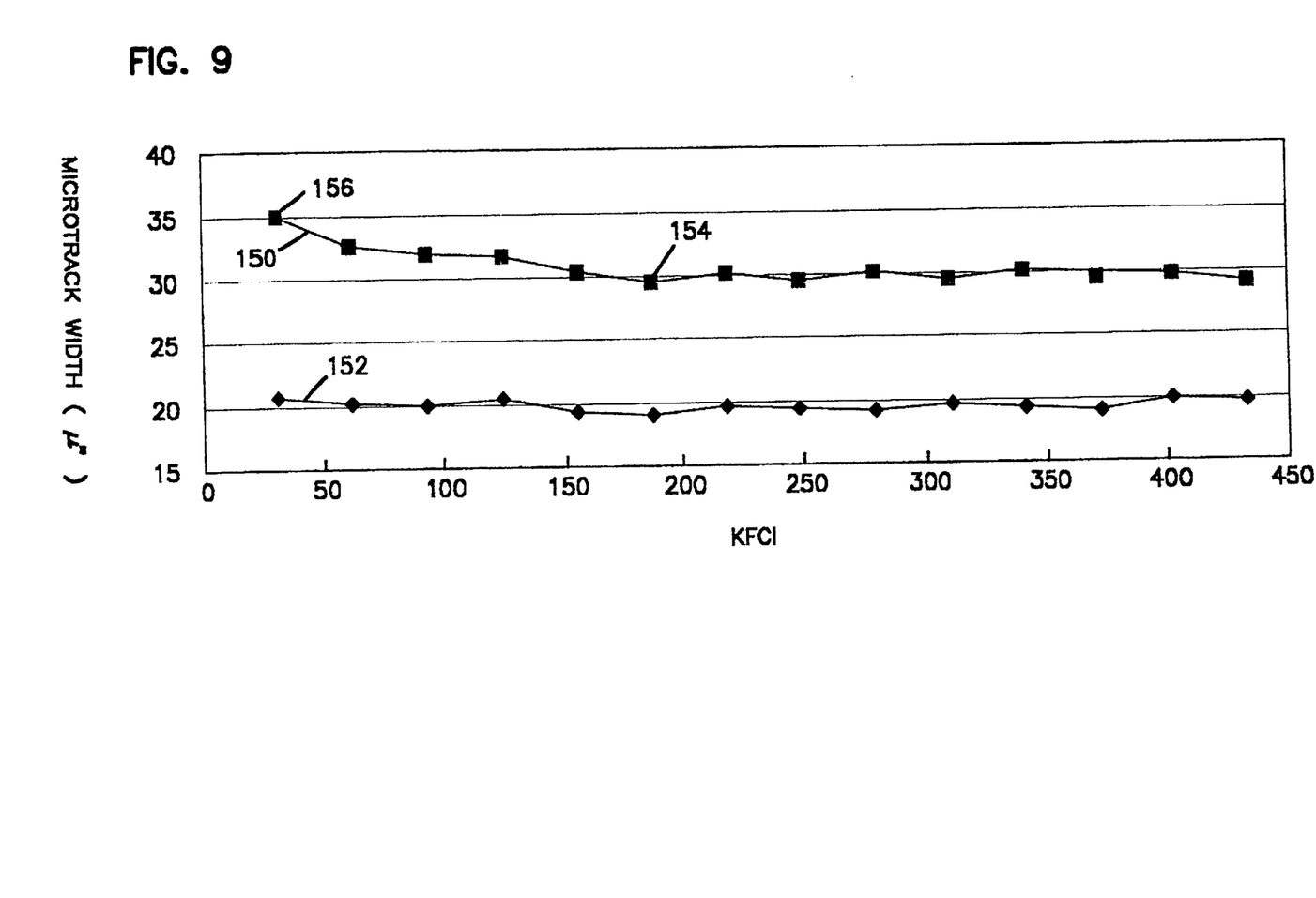
FIG. 9 is a graph illustrating the principles of measuring side-reading of an abutted-junction read head employed in a first embodiment of the present invention.

It will be appreciated that a decrease in side reading at higher transition densities is seen as an apparent narrowing of the head width profile at the higher densities. Thus, FIG. 9 illustrates the change in the response width at the 10% amplitude point (curve 150) and the change in response width at the 50% amplitude point (curve 152) over a range of recording transition densities between about 25 and 200 KFCI. Over this range, curve 150 demonstrates that the 10% response width is reduced by about 6 microinches (152 nanometers), while curve 152, representing the 50% response width, is reduced very little over the range of transition densities. Thus, the 10% response level reduces from point 156 to point 154 by about 6 microinches (from about 35 to 29 microinches), while the location of the microtrack producing a 50% response changed very little. This is consistent with the 3 microinch extension of the width calculated for each side of the head. At transition densities above about 190 KFCI, the head exhibits no significant change in apparent width. Consequently, the side-reading of the head can be calculated from the difference in apparent width of the head between points 154 and 156. Consequently, as shown by FIG. 9, the measurement of the change of the width of 10% response point over the range of track densities is a direct measure of side reading of the head. While response amplitudes below 50% would satisfy the measurement activities contemplated herein, we expect the best results are obtained with responses between about 10% and 30% of peak response amplitude.

The present invention is directed to a process of measuring the side-reading of a head by identifying the width of the response curve for the head at a predetermined response level for various transition frequencies (densities). The predetermined response level is less than 50%, and preferably between 30% and 10%, of the peak response level. The side reading of the head is extrapolated from a plot of the response curve widths to transition frequencies (densities). Consequently, the invention provides a direct measurement of the side reading of the read head.

Figure 10:
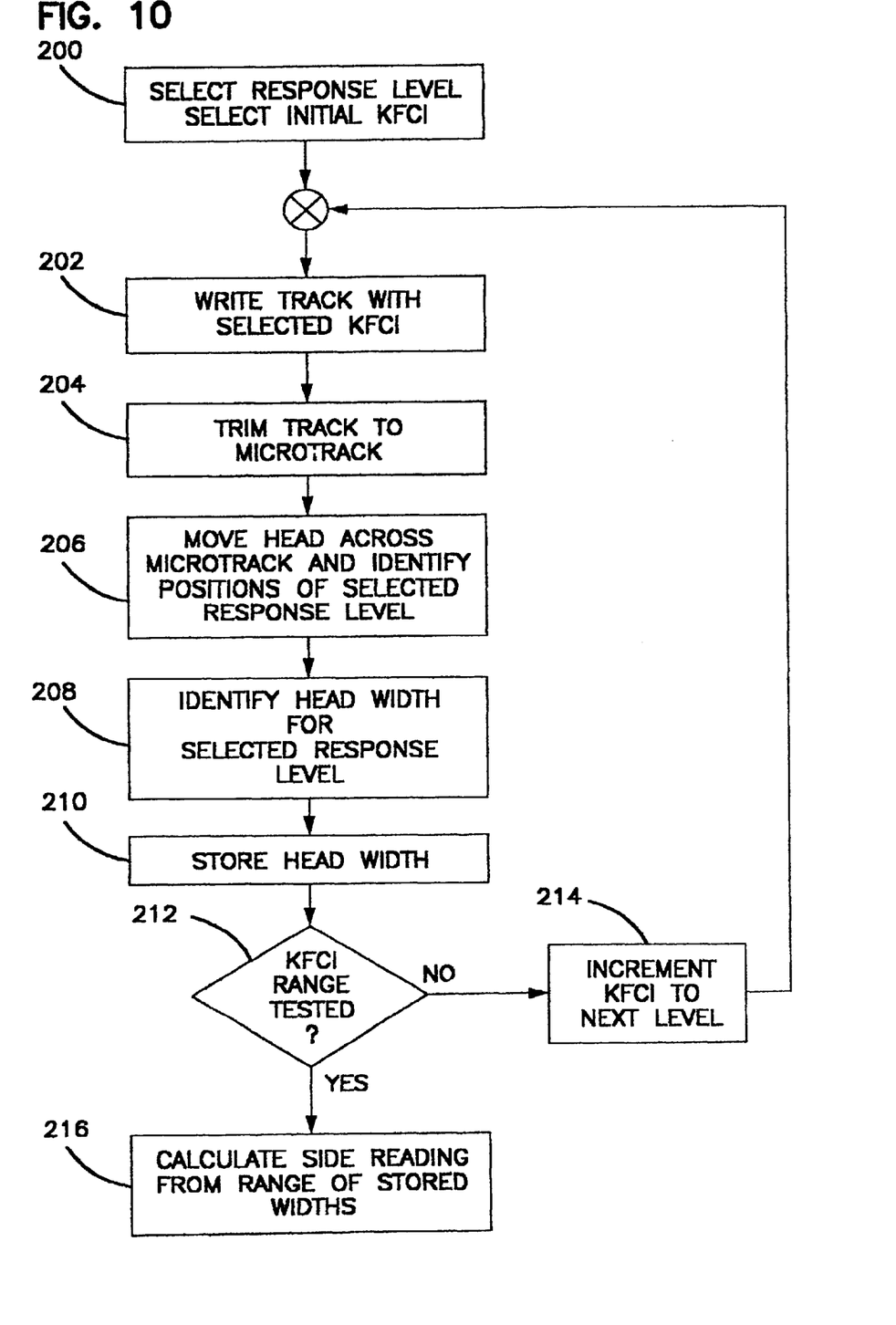
FIG. 10 is a flow chart of a process of measuring the side-reading of an abutted-junction read head according to the first embodiment of the invention.

FIG. 10 is a flow chart of the process for measuring side-reading of an abutted-junction read head according to a first embodiment of the present invention. At step 200, a response level and an initial transition density are selected. Conveniently, but not necessarily, the transitions may be recorded at a selected spacing that does not represent data. In such circumstances, the transitions are at a frequency that correspond to density and can be expressed in numbers of transitions per inch, KFCI. The selected response level is less than 50% of the peak response, and preferably between about 30 and 10%. For purposes of example, the process will be describes using a 10% response level. The initial transition density might, for example, be 50 KFCI, and the process will incrementally increase the density, such as in steps of 50 KFCI, to a maximum at, for example, 450 KFCI. Alternatively, the initial transition density may be 450 KFCI, decreasing in steps to a low density. In either case, at step 202, a test track is written onto an otherwise blank disc at the selected transition density, and at step 204, the track is trimmed to a microtrack. At step 206, the head is moved across the track by an amount greater than its width to identify the positions of the head relative to the microtrack where the head provides the selected response level. More particularly, the head is moved across the microtrack (radially, in the case of a circular microtrack) to identify the peak response (i.e., when the center of the head is positioned adjacent the microtrack) and to measure the response level of the head at various positions relative to the microtrack. At step 208, the apparent width of the head is calculated for the transition frequency represented by the KFCI level of the microtrack, based on response curve and particularly the distance between two points where the head provided the selected response level (e.g., 10%). For example, at step 206, the measured response levels may appear as a response curve like that shown in FIG. 3, with the apparent width calculated at step 208 as the distance on the curve between the two points on the curve where the head provided the selected response level (e.g., 10%). Therefore, the apparent width is identified for the selected transition frequency. The apparent width of the head for the selected transition frequency is stored at step 210.

At step 212, a determination is made as to whether the response levels have extended over a selected range of transition densities (e.g., 50 to 450 KFCI). If they have not, the transition density level is incremented at step 214 and the process loops back to step 202 where the process of steps 202 through 212 iterates until the head widths have been identified over the selected range of transition densities. If, at step 212, the head widths have been measured over the full range of transition densities, the process ends at step 216 with the calculation of the side-reading distance of the head based on the difference in the stored head widths. As illustrated at curve 150 in FIG. 9, a change of the head width for the selected response level (for example, the 10% response level) is identified over the range of transition densities. The slope of curve 150 is a direct measure of the side-reading effect of the head, and the difference of width at points 154 and 156 represents the side-reading distance of the head.

Figure 11:
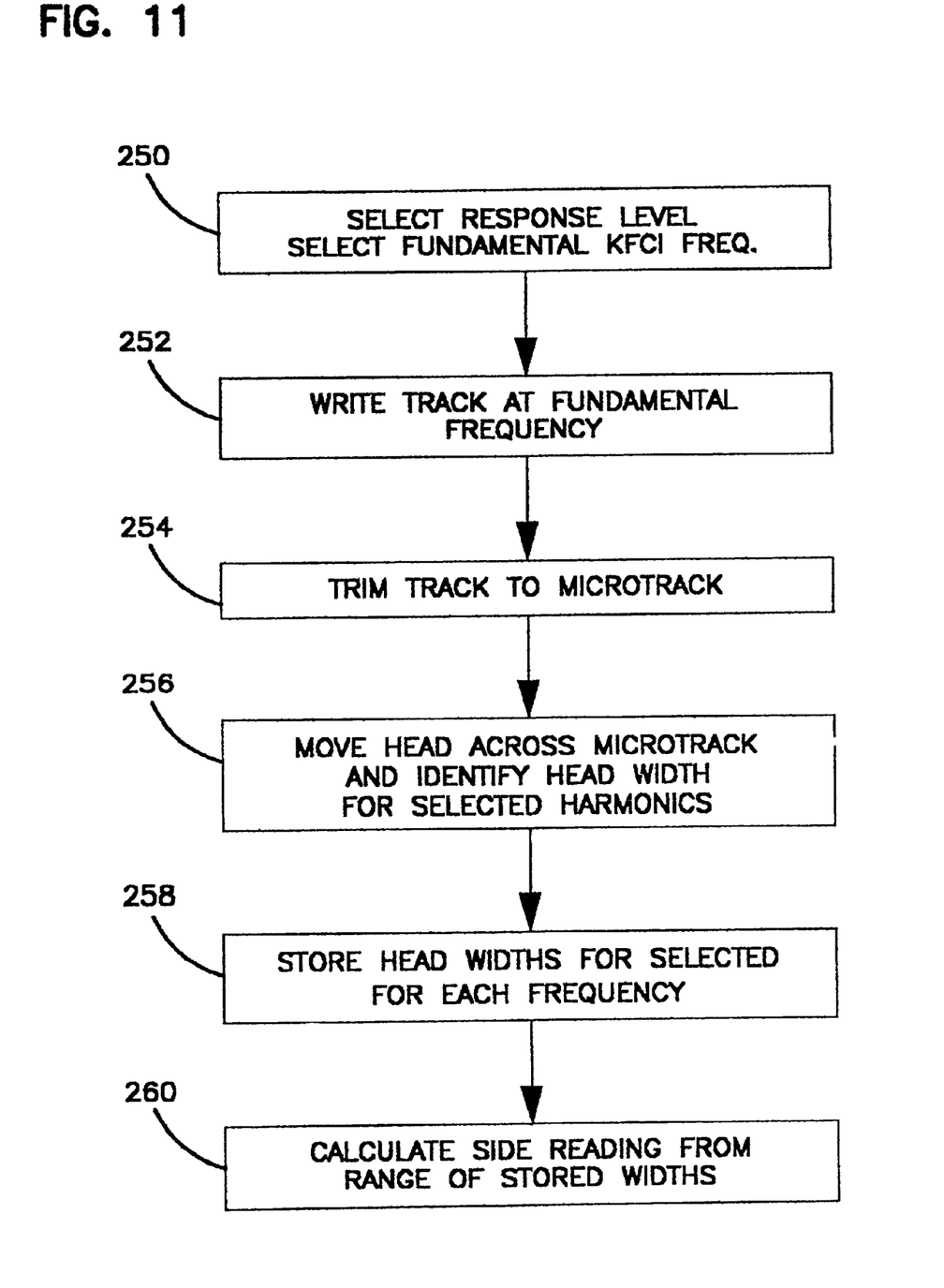
FIG. 11 is a flow chart of a process of measuring the side-reading of an abutted-junction read head according to a second embodiment of the invention.

FIG. 11 is a flow chart of a process for measuring side-reading of an abutted-junction read head according to a second embodiment of the present invention. This embodiment recognizes that the transition density of the test microtrack may be at a selected frequency, and that at the width of the response curve, as in FIG. 3, is different for each measurable harmonic of that frequency. At step 250, a response level and an initial transition frequency are selected. The frequency of the transitions is expressed in numbers of transitions per inch, KFCI, and is the fundamental frequency used in this embodiment of the invention. The fundamental frequency should be low enough to form measurable multiple harmonics, as herein described, yet high enough as to provide data over a range from which side-reading may be interpolated. A recording density of 50 KFCI recorded on a disc track having a 3 inch (7.62 centimeter) diameter and rotating at 7200 rpm provides a fundamental frequency of about 56.5 megaHertz.

The selected response level is less than 50% of the peak response, and preferably between about 30 and 10% as in the embodiment of FIG. 10. For purposes of example, the process will be described using a 10% response level, as in the case of FIG. 10.

At step 252, a test track is written onto an otherwise blank disc at the selected transition density to derive a fundamental frequency, and at step 254, the track is trimmed to a microtrack, as previously described. At steps 256 the head is moved across the track over a distance greater than the head width to identify the width of the response curve at the selected response level. More particularly, the head is moved across the microtrack (radially, in the case of a circular microtrack) to identify the peak response (i.e., when the center of the head is positioned adjacent the microtrack) at the fundamental frequency and at each readable harmonic of the fundamental frequency, namely the odd harmonics— third, fifth, seventh, etc. The position of the head relative to the microtrack is identified for each position where the predetermined response level (10%) is identified for the fundamental and each harmonic frequency. Thus, at step 256 the peak amplitude is identified for the fundamental frequency and each harmonic, and the head is moved incrementally across the microtrack to identify the head width at the selected response level for the fundamental and each harmonic frequency. At step 258, the measured head width for each frequency is stored, hence storing a representation of the width of the response curve for the selected response level at the fundamental and each odd harmonic.

Figure 12:
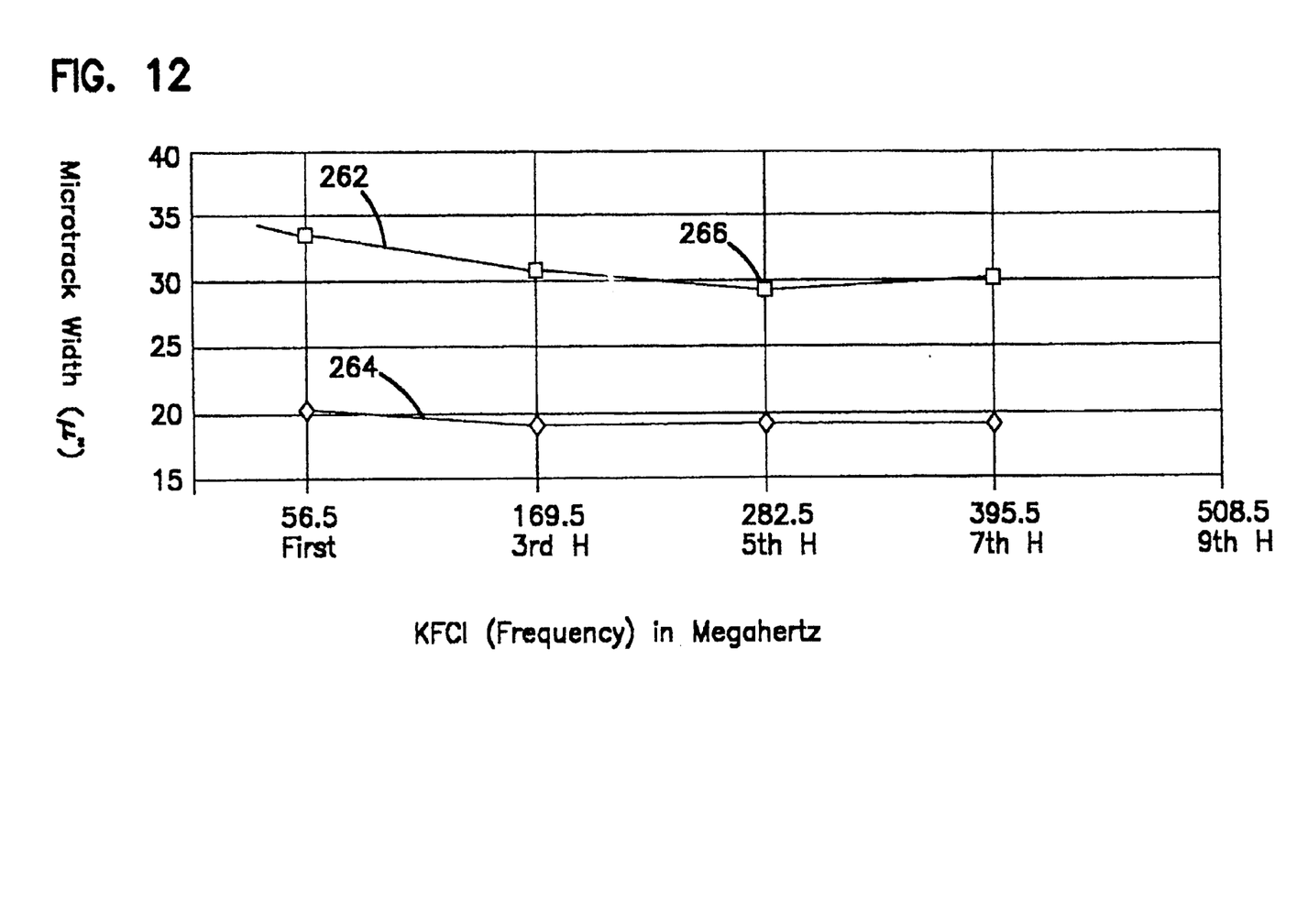
FIG. 12 is a graph illustrating the principles of measuring side-reading of an abutted-junction read head employed in the second embodiment of the invention.

At step 260, the side-reading distance of the head is calculated in the same manner as in FIG. 10. Curve 262 in FIG. 12 plots the widths of the response curve identified at step 256 at the selected response level (for example, the 10% response level) over the range of frequencies. As in the case of curve 150 in FIG. 9, the side-reading distance of the head can be identified from the change of apparent width of the head over the range the frequencies. Curve 262 illustrates a width varying between about 34 microinches at about 28.3 megahertz (which is about 25 KFCI in the example) to about 29 microinches at about 282.5 megahertz (about 250 KFCI in the example). As in the case of curve 150 in FIG. 9, the slope of curve 262 is a direct measure of the side-reading effect of the head. Curve 264, which represents the data identifying the width of the response curve for the 50% response level, remains substantially flat, as in the case of curve 152 in FIG. 9, indicating substantially no change in the width of the response curve at the 50% response level over the range of harmonic frequencies.

The principal advantage of the process of FIG. 11 resides in the need for only a single microtrack recorded at a density representing a fundamental transition frequency, whereas the process of FIG. 10 requires separate microtracks for each transition density. Measuring the width of the response curve at the desired level (e.g., 10%) at each odd harmonic of the fundamental frequency provides similar results to the process the FIG. 10. However, the process of FIG. 11 ordinarily results in fewer data points for curve 262 (FIG. 12), which can result in less accurate results. For example, curve 152, taken with a greater number of data points, indicates side-reading of 6 microinches, whereas curve 262 indicates side-reading of 5 microinches. Hence, the process of FIG. 11 is faster, easier, but less accurate.

In summary, the invention provides a useful tool for the development of abutted-junction transducers 10, such as read heads, to identify the side-reading effect of the transducers. The transducer is moved relative to at least one microtrack (steps 206 and 256) having a selected transition density (steps 200 and 250). A plurality of positions of the transducer are identified (steps 206 and 258) relative to the at least one microtrack where the transducer 10 provides a predetermined response. The side-reading distance of the transducer is identified from the plurality of positions (steps 216 and 260).

In the embodiment of FIG. 10, a plurality of microtracks are iteratively constructed (loop including steps 214 and 202), each microtrack having a different transition density (step 214). The positions of the transducer are identified during each iteration relative to the respective microtrack where the transducer provides the predetermined response (step 206).

In the embodiment of FIG. 11, the selected transition density has a fundamental frequency (step 250). A position of the transducer is identified relative to the microtrack where the transducer provides the predetermined response at each of a plurality of harmonic frequencies of the fundamental frequency (step 258).

In preferred embodiments, the response level is less than 50% of the peak response, and preferably between 10 and 30% of peak level.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the side-reading measurement while maintaining substantially the same functionality without departing from the scope and spirit of the present invention. In addition, although the preferred embodiment described herein is directed to a GMR head for a disc drive system, it will be appreciated by those skilled in the art that the teachings of the present invention can be applied to other abutted-junction transducing devices, including MR heads, impact transducers, accelerometers and the like, and to other systems, such as tape drive systems, without departing from the scope and spirit of the present invention.

What is claimed is:

1. A process for measuring side-reading of an abutted-junction magnetic transducer, the process including steps of:
 a) moving the transducer relative to each of a plurality of microtracks each having a respective transition density, the transition densities defining a range of densities over which a change in transducer response width can be identified;
 b) identifying a plurality of off-track positions of the transducer, each off-track position being relative to a respective microtrack where the transducer provides a predetermined response; and
 c) identifying the side-reading of the transducer from the plurality of positions.

2. The process of claim 1, wherein each microtrack for step (a) is constructed by steps of:
 a1) constructing a track having a transition density, the transition density being different for each track, and
 a2) trimming the track to a microtrack.

3. The process of claim 2, wherein steps (a1) and (a2) are performed iteratively.

4. The process of claim 1, wherein step (b) includes:
 b1) storing a representation of the position of the center of the transducer relative to the microtrack.

5. The process of claim 1, wherein step (b) includes
 b1) storing representations of the identified positions, and step (c) includes steps of:
 c1) plotting the stored representations of the identified positions of the transducer as a function of the transition density, and
 c2) identifying the side-reading of the transducer from the plot.

6. The process of claim 1, wherein the predetermined response is less than 50% of a peak response of the transducer.

7. The process of claim 6, wherein the predetermined response is between 10% and 30% of the peak response.

8. A process for measuring side-reading of an abutted-junction transducer, the process including steps of;

a) moving a transducer relative to a microtrack having a selected transition density having a fundamental frequency;
b) for each of a plurality of harmonic frequencies of the fundamental frequency, identifying a position of the transducer relative to the microtrack where the transducer provides a predetermined response; and
c) identifying side-reading of the transducer from the positions identified in step b).

9. The process of claim 8, wherein step (c) includes steps of:
   c1) identifying a plurality of response widths of the transducer, each response width being based on the identified position of the transducer for each of the harmonic frequencies, and
   c2) calculating the side-reading based on the plurality of response widths.

10. The process of claim 9, wherein step (c1) includes a response width based on the identified position of the transducer for the fundamental frequency.

11. The process of claim 8, wherein step (a) includes steps of:
    a1) constructing a track having the selected transition density, and
    a2) trimming the track to a microtrack.

12. A process for measuring the side-reading of an abutted-junction magnetic transducer, the process including steps of:
    a) constructing a first track having a first transition density;
    b) trimming the first track to a first microtrack;
    c) moving the transducer across the first microtrack;
    d) identifying a first plurality of positions of the transducer relative to the first microtrack where the transducer provides a predetermined response;
    e) constructing a second track having a second transition density different from the first transition density;
    f) trimming the second track to a second microtrack;
    g) moving the transducer across the second microtrack;
    h) identifying a second plurality of positions of the transducer relative to the second microtrack where the transducer provides the predetermined response; and
    i) calculating the side-reading of the transducer from the first and second pluralities of positions.

13. The process of claim 12, wherein step (d) includes:
    d1) storing a representation of a first distance between the positions of the first plurality of positions, and step (h) includes:
    h1) storing a representation of a second distance between the positions of the second plurality of positions.

14. The process of claim, 13, wherein step (i) includes:
    i1) interpolating the side-reading of the transducer from the first and second distances.

15. The process of claim 12, wherein the predetermined response is less than 50% of a peak response of the transducer.

16. A process for measuring the side-reading of an abutted-junction magnetic transducer, the process including steps of:
    a) constructing a track having a transition density defining a fundamental frequency;
    b) trimming the track to a microtrack;
    c) moving the transducer across the microtrack;
    d) reading the microtrack by the transducer to derive a plurality of responses at each of a plurality of harmonic frequencies of the fundamental frequency;
    e) for each harmonic frequency, identifying a plurality of positions of the transducer relative to the microtrack where the transducer provides a predetermined response; and
    f) calculating the side-reading of the transducer from the pluralities of positions.

17. The process of claim 16, wherein step (e) includes:
    e1) for each harmonic frequency, storing a representation of a distance between the positions of the respective plurality of positions.

18. The process of claim 17, wherein step (f) includes:
    f1) interpolating the side-reading of the transducer from the distances for each harmonic frequency.

19. The process of claim 16, wherein step (e) includes:
    e1) identifying a plurality of positions of the transducer relative to the microtrack where the transducer provides the predetermined response for the fundamental frequency.

20. The process of claim 16, wherein the predetermined response is less than 50% of a peak response of the transducer.

* * * * *